United States Patent
Heinrich et al.

(10) Patent No.: US 9,771,498 B2
(45) Date of Patent: Sep. 26, 2017

(54) MOISTURE CURABLE POLYAMIDES AND METHODS FOR USING THE SAME

(75) Inventors: Dwight Heinrich, Aurora, IL (US); Tina Nataniel, Saint Charles, IL (US)

(73) Assignee: Henkel IP & Holding GmbH, Duesseldorf (DE)

( * ) Notice: Subject to any disclaimer, the term of this patent is extended or adjusted under 35 U.S.C. 154(b) by 758 days.

(21) Appl. No.: 12/622,765

(22) Filed: Nov. 20, 2009

(65) Prior Publication Data

US 2011/0123817 A1    May 26, 2011

(51) Int. Cl.
```
C08G 69/34    (2006.01)
C08G 69/26    (2006.01)
C09J 5/00     (2006.01)
C08G 69/40    (2006.01)
C08G 73/06    (2006.01)
C08L 77/08    (2006.01)
C09J 177/08   (2006.01)
C08G 69/48    (2006.01)
C09J 201/10   (2006.01)
C08K 5/54     (2006.01)
C08K 5/5419   (2006.01)
C08K 5/5435   (2006.01)
C08K 5/5465   (2006.01)
```

(52) U.S. Cl.
CPC .............. *C09J 5/00* (2013.01); *C08G 69/265* (2013.01); *C08G 69/34* (2013.01); *C08G 69/40* (2013.01); *C08G 73/0633* (2013.01); *C08L 77/08* (2013.01); *C09J 177/08* (2013.01); *C08G 69/48* (2013.01); *C08K 5/5406* (2013.01); *C08K 5/5419* (2013.01); *C08K 5/5435* (2013.01); *C08K 5/5465* (2013.01); *C09J 201/10* (2013.01); *Y10T 428/31725* (2015.04); *Y10T 428/31783* (2015.04)

(58) Field of Classification Search
CPC ...... C08G 69/265; C08G 69/34; C08G 69/40; C08G 69/48; C08G 73/0633; C08K 5/5406; C08K 5/5419; C08K 5/5435; C08K 5/5465; C08L 77/08; C09J 177/08; C09J 5/00; C09J 201/10; Y10T 428/31725; Y10T 428/31783
See application file for complete search history.

(56) References Cited

U.S. PATENT DOCUMENTS

| | | | |
|---|---|---|---|
| 4,082,708 A | | 4/1978 | Mehta |
| 4,647,630 A | * | 3/1987 | Schmid et al. ............... 525/431 |
| 5,055,249 A | * | 10/1991 | Schmid ......................... 264/236 |
| 5,075,407 A | | 12/1991 | Cody et al. |
| 5,519,109 A | * | 5/1996 | Kinzelmann et al. ........ 528/322 |
| 6,864,349 B2 | | 3/2005 | Pavlin et al. |
| 6,870,011 B2 | | 3/2005 | Macqueen et al. |
| 2007/0155904 A1 | * | 7/2007 | Chou ............................ 525/207 |

FOREIGN PATENT DOCUMENTS

WO    WO 9947584 A1 *  9/1999

OTHER PUBLICATIONS

Machine translation of WO 9947584 A1 (2015).*
International Search Report issued in connection with International Application No. PCT/US2010/056643 mailed Aug. 25, 2011.

* cited by examiner

*Primary Examiner* — Callie Shosho
*Assistant Examiner* — John Freeman
(74) *Attorney, Agent, or Firm* — James E. Piotrowski

(57) ABSTRACT

The present invention is directed to polyamides that are crosslinkable in the presence of water having desirable properties including long open time, good adhesion and cold flexibility. Notably, the polyamides of the present invention are suitable for structural and semi-structural bonding applications utilizing a hot melt process, roll coater or bead extrusion process.

16 Claims, No Drawings

MOISTURE CURABLE POLYAMIDES AND METHODS FOR USING THE SAME

FIELD OF THE INVENTION

The present invention is directed to polyamides that are crosslinkable in the presence of water having desirable properties including long open time, good adhesion and cold flexibility. Notably, the polyamides of the present invention are suitable for structural and semi-structural bonding applications utilizing a hot melt process, roll coater or bead extrusion process.

BACKGROUND OF THE INVENTION

Currently available polyamides that are crosslinkable in the presence of water have a short open time that is not amenable for roll coater application. Thus, there is a need for polyamides that have a sufficiently long open time suitable for bonding applications utilizing a roll coater or bead extrusion process. In addition, there is a need for polyamides which exhibit desirable thermomechanical properties following crosslinking upon exposure to moisture.

SUMMARY OF INVENTION

In one aspect of the invention, there is provided polyamides that are crosslinkable in the presence of water having desirable properties including long open time, good adhesion and cold flexibility as well as methods for using the same. Advantageously, the compositions are suitable as adhesives for structural and semi-structural bonding applications utilizing a roll coater or bead extrusion process.

In another aspect of the invention, there is provided processes for producing a hot melt composition including a polyamide obtained by polycondensation of: (i) an acid component including at least one dimerized $C_{12}$ to $C_{24}$ unsaturated fatty acid; (ii) at least one $C_6$ to $C_{22}$ aliphatic dicarboxylic acid; (iii) an amine component including at least one $C_6$ to $C_{22}$ alkylene diamine; (iv) at least one heterocyclic secondary diamine; and (v) at least one polyoxyalkylenediamine.

In addition, in one aspect of the invention, there is provided hot melt compositions produced by the aforementioned processes.

In one aspect of the invention, there is provided articles including a first substrate joined to a second substrate by an adhesive including a hot melt composition of the present invention.

The invention also provides processes for producing a moisture-curable hot melt composition including reacting: (i) the aforementioned polyamide; and (ii) a functionalized alkoxysilane under conditions resulting in attachment of di-alkoxysilane or tri-alkoxysilane terminal groups to the polyamide.

In another aspect of the invention, there is provided moisture-curable hot melt compositions produced by the aforementioned processes.

In addition, there is provided methods of bonding a first substrate to a second substrate including the steps of applying a moisture-curable hot melt composition of the present invention to a surface of said first substrate to form a coating on said surface, contacting said surface having the coating with a surface of said second substrate and permitting the moisture-curable hot melt composition to moisture-cure.

In yet another aspect of the present invention, there is provided methods of providing a moisture-curable coating to a substrate including the steps of: (a) providing a moisture-curable hot melt composition of the present invention; (b) heating said moisture-curable hot melt composition to a flowable state; (c) applying said moisture-curable hot melt composition to a substrate surface to form a coating; (d) permitting said coating to moisture-cure.

DETAILED DESCRIPTION

As used herein, the phrase "open time" with reference to an adhesive of the present invention refers to the time, after initial application, during which the adhesive can still wet out a second substrate.

As used herein, the term "curing time" with reference to an adhesive of the present invention refers to the time during which the polyamide crosslinks after being stored under specific conditions.

As used herein, the term "set time" refers to a time prior to fully curing associated with a surface cure which no longer wets out or is tacky to the touch. Generally, the green strength of an adhesive is measured at the set time.

As used herein, the term "green strength" refers to the ability of an adhesive to hold two surfaces together when first contacted and before the adhesive develops its ultimate bonding properties when fully cured. The degree of green strength exhibited by an adhesive is very important in many applications. High green strength adhesives tend to prevent wrinkling and slippage of films during lamination. In panel assembly and packaging, faster handling and wrapping rates can be achieved with such high green strength adhesives. When adhesives are applied to a vertical surface, a sufficiently high green strength allows the adhesive to prevent a mechanically unsupported, bonded member from slipping under the influence of gravity. When employed for flocking, a high green strength adhesive holds the fibers in place while curing. Also, in the laying of carpet or synthetic flooring, adhesives having a high green strength resist curling due to the shape memory of the flooring which is acquired when stored in a roll.

The polyamides of the present invention are cured in the presence of humidity after a defined time which varies according to the nature of the crosslinkable polyamide. One skilled in the art will understand that the presence and degree of crosslinking, i.e., the crosslink density, can be determined by a variety of methods, such as dynamic mechanical thermal analysis (DMA) using a TA Instruments DMA 2980 DMA analyzer over a temperature range of −65° F. (−18° C.) to 350° F. (177° C.) conducted under nitrogen according to ASTM D 4065-01. This method determines the glass transition temperature and crosslink density of free films of coatings or polymers. These physical properties of a cured material are related to the structure of the crosslinked network.

The polyamides of the present invention are useful as laminating or structural adhesives suitable for use in plastics, appliances, furniture, bookbinding, woodworking as well as other industrial applications requiring structural or semi-structural binding.

Additionally, the polyamides of the present invention are useful in applications including sealants, caulk, plastics and other materials.

The polyamides of the present invention may be applied utilizing a reactive hotmelt process, roll coater or bead extrusion process.

In certain embodiments of the present invention, there is provided articles including a first substrate joined to a second substrate by an adhesive including a hot melt composition of the present invention wherein at least one substrate is paper, plastic or wood.

In certain embodiments of the present invention, there is provided methods of bonding a first substrate to a second substrate including the steps of heating a moisture-curable hot melt composition of the present invention to make it flowable prior to applying, applying the moisture-curable hot melt composition of the present invention to a surface of said first substrate to form a coating on said surface, contacting said surface having the coating with a surface of said second substrate and permitting the moisture-curable hot melt composition to moisture-cure.

In one embodiment, methods of the present invention apply the moisture-curable hot melt compositions by means of bead extrusion. In another embodiment, methods of the present invention apply the moisture-curable hot melt compositions by means of a roller applicator.

Polyamides

Polyamides of the present invention are formed from polycondensation of a) an acid component including at least one dimerized $C_{12}$ to $C_{24}$ unsaturated fatty acid, at least one $C_6$ to $C_{22}$ aliphatic dicarboxylic acid; and b) an amine component including at least one $C_6$ to $C_{22}$ alkylene diamine, at least one heterocyclic secondary diamine and at least one polyoxyalkylenediamine. An overbalance of amine component results in an amine terminated polyamide which has a desirable combination of thermomechanical properties including long open time, good adhesion and cold flexibility.

In certain embodiments, the acid component further comprises at least one monomer fatty acid.

In certain embodiments, at least one dimerized $C_{12}$ to $C_{24}$ unsaturated fatty acid is a dimerized $C_{18}$ unsaturated fatty acid.

In certain embodiments, at least one polyoxyalkylenediamine is a polyether-based diamine having an approximate molecular weight in the range of 300 to 2000 daltons and having the structure $H_2N$—$R_1$—O—$(R_2O)x$-$R_3$—$NH_2$ wherein $R_1$, $R_2$ and $R_3$ are $C_1$-$C_4$ alkyl and x is 5 to 34.

In certain embodiments, the acid component to the amine component is in a ratio of about 0.7:1 to about 1:0.8.

Furthermore, the resultant aminofunctional polyamides may be reacted with a functionalized alkoxysilane under conditions resulting in attachment of di-alkoxysilane or tri-alkoxysilane terminal groups to the polyamide. This modification to the polyamide imparts the property of moisture curability thereto.

In certain embodiments, the functionalized alkoxysilane component to the polyamide component is in a molar ratio of about 0.8:1 to about 2:1.

In certain embodiments, the amount of functionalized alkoxysilane component reacted is in an amount greater than 1 equivalent but less than 2 equivalents relative to the polyamide.

In certain embodiments, the functionalized alkoxysilane is an isocyanate-functional alkoxysilane, an epoxide-functional alkoxysilane or a chloromethylphenyl-functional alkoxysilane.

In certain embodiments, the moisture-curable hot melt compositions of the present invention have an open time of at least 90 seconds. In certain embodiments, the moisture-curable hot melt compositions of the present invention have an open time of at least 2 minutes. In certain embodiments, the moisture-curable hot melt compositions of the present invention have an open time of about 2 minutes to about 6 minutes. In certain embodiments, the moisture-curable hot melt compositions of the present invention have an open time of about 4 minutes. In certain embodiments, the moisture-curable hot melt compositions of the present invention have an open time of up to 8 minutes.

In certain embodiments, the moisture-curable hot melt compositions of the present invention have a viscosity at 350° F. and 1 atmosphere pressure in the range of about 10 P to about 190 P. In certain embodiments, the moisture-curable hot melt compositions of the present invention have a viscosity at 350° F. and 1 atmosphere pressure in the range of about 10 P to about 60 P. In certain embodiments, the moisture-curable hot melt compositions of the present invention have a viscosity at 350° F. and 1 atmosphere pressure of about 10 P to about 30 P. In certain embodiments, the moisture-curable hot melt compositions of the present invention have a viscosity at 350° F. and 1 atmosphere pressure of about 16 P.

In certain embodiments, the moisture-curable hot melt compositions of the present invention have a softening point of 125° C. or less. In certain embodiments, the moisture-curable hot melt compositions of the present invention have a softening point of at least 110° C. In certain embodiments, the moisture-curable hot melt compositions of the present invention have a softening point of at least 115° C. In certain embodiments, the moisture-curable hot melt compositions of the present invention have a softening point in the range of about 110° C. to about 120° C.

In certain embodiments, the moisture-curable hot melt compositions of the present invention have a curing time of at least 7 days. In certain embodiments, the moisture-curable hot melt compositions of the present invention have a curing time of at least 9 days. In certain embodiments, the moisture-curable hot melt compositions of the present invention have a curing time of at least 14 days. In certain embodiments, the moisture-curable hot melt compositions of the present invention have a curing time in the range of about 7 days to about 21 days. In certain embodiments, the moisture-curable hot melt compositions of the present invention have a curing time of about 7 days to about 28 days.

In certain embodiments, the moisture-curable hot melt compositions of the present invention have a mechanical strength of at least 31 MPa as measured using ASTM Standard D 638-00. In certain embodiments, the moisture-curable hot melt compositions of the present invention have a mechanical strength of at least 34 MPa as measured using ASTM Standard D 638-00. In certain embodiments, the moisture-curable hot melt compositions of the present invention have a mechanical strength of at least 54 MPa as measured using ASTM Standard D 638-00. In certain embodiments, the moisture-curable hot melt compositions of the present invention have a mechanical strength in the range of about 34 MPa to about 74 MPa as measured using ASTM Standard D 638-00. In certain embodiments, the moisture-curable hot melt compositions of the present invention have a mechanical strength of up to about 86 MPa as measured using ASTM Standard D 638-00.

In certain embodiments, the moisture-curable hot melt compositions of the present invention have an elongation of at least 40% as measured using ASTM Standard D 638-00. In certain embodiments, the moisture-curable hot melt compositions of the present invention have an elongation in the range of about 80% to about 200% as measured using ASTM Standard D 638-00. In certain embodiments, the moisture-curable hot melt compositions of the present invention have an elongation of about 130% as measured using ASTM Standard D 638-00. In certain embodiments, the moisture-curable hot melt compositions of the present invention have an elongation in the range of about 80% to about 290% as measured using ASTM Standard D 638-00. In certain embodiments, the moisture-curable hot melt compositions of the present invention have an elongation of up to about 300% as measured using ASTM Standard D 638-00.

In certain embodiments, the moisture-curable hot melt compositions of the present invention have an ultimate tensile break of at least 180 psi. In certain embodiments, the moisture-curable hot melt compositions of the present invention have an ultimate tensile break of at least 310 psi. In certain embodiments, the moisture-curable hot melt compositions of the present invention have an ultimate tensile break in the range of about 310 psi to about 610 psi. In certain embodiments, the moisture-curable hot melt compositions of the present invention have an ultimate tensile break of about 460 psi. In certain embodiments, the moisture-curable hot melt compositions of the present invention have an ultimate tensile break of up to about 780 psi.

In certain embodiments, the moisture-curable hot melt compositions of the present invention have a yield point of at least 290 psi. In certain embodiments, the moisture-curable hot melt compositions of the present invention have a yield point in the range of about 290 psi to 490 psi. In certain embodiments, the moisture-curable hot melt compositions of the present invention have a yield point of about 390 psi. In certain embodiments, the moisture-curable hot melt compositions of the present invention have a yield point of up to 600 psi.

Acid Component

Suitable dimerized $C_{12}$ to $C_{24}$ unsaturated fatty acids for use in the present invention include but are not limited to a dimer acid mixture with approximately 94% high dibasic acid content (e.g., Empol® 1061 having approximately 3.5% monobasic acid, approximately 94% dibasic acid, and approximately 2.5% polybasic acid, commercially available from Cognis, Monheim, Germany).

Suitable $C_6$ to $C_{22}$ aliphatic dicarboxylic acids for use in the present invention include but are not limited to sebacic acid, azelaic acid, stearic acid, and mixtures of two or more thereof. In certain embodiments, the compositions of the present invention include sebacic acid and stearic acid.

Sebacic acid is a $C_{10}$ dicarboxylic acid having the structure $(HOOC)(CH_2)_8(COOH)$ that is derived from castor oil (e.g., commercially available from Arizona Chemical, Jacksonville, Fla., United States).

Azelaic acid is a $C_9$ dicarboxylic acid (also known by the Chemical Abstract Index Name nonanedioic acid) having the structure $HO_2C(CH_2)_7CO_2H$ that occurs naturally in wheat, rye, and barley and is also naturally produced by *Malassezia furfur* (also known as *Pityrosporum ovale*) (e.g., Emerox® 1144, commercially available from Cognis, Monheim, Germany).

Stearic acid is a $C_{18}$ dicarboxylic acid having the structure $C_{18}H_{36}O_2$, or $CH_3(CH_2)_{16}COOH$ that occurs in many animal and vegetable fats and oils (e.g., commercially available from Cognis, Monheim, Germany).

Suitable monomer fatty acids for use in the present invention include but are not limited to PRIFRAC 2980, RESINOLINE BD2, TOFA and mixtures thereof.

Tall Oil Fatty Acid (TOFA) is a mixture of volatile fatty acids having a rosin content of 1-10% (e.g., commercially available from MWV, Glen Allen, Va., United States).

PRIFRAC 2980 is a $C_{18}$ monoacid (e.g., commercially available from Unichema North America, Chicago, Ill., United States).

RESINOLINE BD2 is a fatty acid of wood oil at 2% max of resinic acid (e.g., commercially available from DRT-GRANEL, Pax, France).

Amine Component

Suitable amines for use in the present invention include but are not limited to ethylenediamine (EDA), hexamethylenediamine (HMDA), piperazine (PIP), polyoxyalkylenediamine is a polyether-based diamine having an approximate molecular weight in the range of 300 to 2000 daltons and having the structure $H_2N-R_1-O-(R_2O)x-R_3-NH_2$ wherein $R_1$, $R_2$ and $R_3$ are $C_1$-$C_4$ alkyl and x is 5 to 34 and mixtures of two or more thereof. In certain embodiments, the compositions of the present invention include piperazine, Jeffamine D400 and Jeffamine D2000.

Ethylenediamine having the formula $C_2H_4(NH_2)_2$ is manufactured by reacting ammonia and 1,2-dichloroethane (e.g., commercially available from Huntsman, Salt Lake City, Utah, United States).

Hexamethylenediamine (HMDA) having the formula $H_2N(CH_2)_6NH_2$ may be manufactured by hydrogenation of adiponitrile (e.g., commercially available from Sigma-Aldrich Company Ltd., St. Louis, Mo., United States).

Piperazine is an organic compound that consists of a six-membered ring containing two opposing nitrogen atoms having the formula $C_4H_{10}N_2$ (e.g., commercially available from Orchid Chemical Supplies, Ltd., Hangzhou, China).

Suitable polyoxyalkenediamines include, but are not limited to, polyoxyalkylenediamine is a polyether-based diamine having an approximate molecular weight in the range of 300 to 2000 daltons and having the structure $H_2N-R_1-O-(R_2O)x-R_3-NH_2$ wherein $R_1$, $R_2$ and $R_3$ are $C_1$-$C_4$ alkyl and x is 5 to 34 (JEFFAMINE® commercially available from Huntsman, Salt Lake City, Utah, United States). In certain embodiments, at least one polyoxyalkenediamine is JEFFAMINE® D-400 and/or JEFFAMINE® D-2000.

Silane Component

Suitable silane components for use in the present invention include but are not limited to isocyanate-functional alkoxysilane, epoxide-functional alkoxysilane, chloromethylphenyl-functional alkoxysilane and mixtures of two or more thereof.

Examples of functionalized silane components include, but are not limited to gamma-glycidoxypropyltrimethoxysilane (e.g., commercially available from Power Chemical Corp., Jiangsu, China), ((chloromethyl)phenylethyl)trimethoxy-silane (e.g., commercially available from ChemPacific Corp., Baltimore, Md., United States), and gamma-glycidoxypropylmethyldimethoxysilane (e.g., commercially available from Power Chemical Corp., Jiangsu, China).

Additive Component

One or more additive components may optionally be added to the polyamides of the present invention and include but are not limited to conventional additives including antioxidants (e.g., Ciba® Irganox® 1010 (commercially available from CIBA Specialty Chemicals, Inc., Basel, Switzerland), pigments, anti-azurants, accelerators, stabilizers, plasticizers, and tackifying resins. Such additives are known to the person skilled in the art.

In certain embodiments, one or more additive components do not significantly impact the thermomechanical properties of the polyamide.

In certain other embodiments, one or more additives impact one or more properties of the polyamide (e.g. open time, green time, curing time, or any thermomechanical property thereof including viscosity, softening point, or mechanical strength after curing).

Process for Making Polyamides

Polyamides of the present invention may be synthesized by the following process.

Step 1: Combine the reactive components, specifically, the acid component and amine component.

Step 2: Optionally, add non-reactive additives such as pigments, antioxidants, anti-azurants.

Step 3: Optionally, add precursor of silane graft (e.g., isocyanate-functional silane, epoxide-functional silane, or chloromethylphenyl-functional silane) to form alkoxy-silane-functionalized polyamide.

The resultant composition may be poured into suitable packaging for distribution. Note that the composition may be partially cured at the time of packaging under the effect of moisture from the packaging and/or the environment.

Exemplary polyamides of the present invention set forth in Tables 1-5 below were prepared by mixing the reactant components, recited therein in parts by equivalent, heating the blended materials for 90 min. under nitrogen at 227° C. followed by an additional 60 min. under vacuum at 227° C. to obtain the polyamide. The temperature was subsequently lowered to 177° C. and silane was charged dropwise under nitrogen by the aid of a dropping funnel. The mixture was stirred at this temperature for 60 min. and for an additional 2 min. under vacuum to obtain a bubble-free, moisture curable polyamide.

The invention may be further understood with reference to the following non-limiting examples.

EXAMPLES

Crosslinkable polyamides of the present invention were prepared in accordance with the aforementioned process using the components and amounts detailed below in Tables 1-5. Specifically, Tables 1 and 2 provide exemplary crosslinkable polyamide compositions with silanation of amine terminated polyamides using gamma-glycidoxypropyltrimethoxysilane (A-187). Table 3 provides exemplary crosslinkable polyamide compositions with silanation of acid terminated polyamides using gamma-glycidoxypropyltrimethoxysilane (A-187). Table 4 provides exemplary crosslinkable polyamide compositions with silanation of amine terminated polyamides using ((chloromethyl)phenylethyl)trimethoxysilane (SIC2295.5). Table 5 provides exemplary crosslinkable polyamide compositions with silanation of amine terminated polyamides using gamma-glycidoxypropylmethyldimethoxysilane (SIG 5836.0).

TABLE 1

INVENTIVE COMPOSITIONS

| COMPONENT | EQ. % | | | | | |
|---|---|---|---|---|---|---|
| | A | B | C | D | E | F |
| Dimer Acid | 77 | 80 | 80 | 80 | 80 | 80 |
| Sebacic Acid | 20 | 20 | 20 | 20 | 20 | 20 |
| Stearic Acid | 3 | — | — | — | — | — |
| TOFA | — | — | — | — | — | — |
| HMDA, 70% | 45 | 45 | 45 | 45 | 45 | 45 |
| Piperazine | 37 | 43 | 43 | 43 | 43 | 43 |
| Jeffamine D400 | 10 | 7 | 7 | 7 | 7 | 7 |
| Jeffamine D2000 | 8 | 5 | 5 | 5 | 5 | 5 |
| Acid/Amine Ratio | 0.82/1 | 0.78/1 | 0.78/1 | 0.78/1 | 0.78/1 | 0.78/1 |
| A-187, Wt. % | 5.6 | 5.2 | 5.9 | 7 | 8.1 | 9.2 |
| A-187/Polyamide Molar Ratio | 1.5/1 | 1/1 | 1.2/1 | 1.5/1 | 1.7/1 | 2/1 |
| A-171, Wt. % | — | — | — | — | — | — |

TABLE 2

INVENTIVE COMPOSITIONS

| COMPONENT | EQ. % | | | | | |
|---|---|---|---|---|---|---|
| | G | H | I | J | K | L |
| Dimer Acid | 80 | 80 | 77 | 77 | 80 | 80 |
| Sebacic Acid | 20 | 20 | 20 | 20 | 20 | 20 |
| Stearic Acid | — | — | — | — | — | — |
| TOFA | — | — | 3 | 3 | — | — |
| HMDA, 70% | 47 | 47 | 47 | 47 | 45 | 47 |
| Piperazine | 47 | 47 | 53 | 53 | 43 | 47 |
| Jeffamine D400 | 4 | 4 | — | — | 7 | 4 |
| Jeffamine D2000 | 2 | 2 | — | — | 5 | 2 |
| Acid/Amine Ratio | 0.78/1 | 0.78/1 | 0.82/1 | 0.82/1 | 0.78/1 | 0.78/1 |
| A-187, Wt. % | 5.4 | 8.4 | 7.4 | 5 | 5.8 | 6.2 |
| A-187/Polyamide Molar Ratio | 1/1 | 1.65/1 | 1.5/1 | 1/1 | 1.2/1 | 1.2/1 |
| A-171, Wt. % | — | — | — | — | 1.4 | 1.4 |

TABLE 3

INVENTIVE COMPOSITIONS

| COMPONENT | EQ. % | | |
|---|---|---|---|
| | M | N | O |
| Dimer Acid | 66 | 66 | 66 |
| Sebacic Acid | 30 | 30 | 30 |
| Stearic Acid | 4 | 4 | 4 |
| TOFA | — | — | — |
| HMDA, 70% | 47 | 47 | 47 |
| Piperazine | 47 | 47 | 47 |
| Jeffamine D400 | 4 | 4 | 4 |
| Jeffamine D2000 | 2 | 2 | 2 |
| Acid/Amine Ratio | 1/0.9 | 1/0.9 | 1/0.9 |
| A-187/Polyamide Molar Ratio | 1/1 | 1.5/1 | 2/1 |
| A-187, Wt. % | 4.2 | 6 | 7.7 |

TABLE 4

INVENTIVE COMPOSITIONS

| COMPONENT | EQ. % | | | | |
|---|---|---|---|---|---|
| | P | Q | R | S | T |
| Dimer Acid | 68 | 73 | 75 | 76 | 80 |
| Sebacic Acid | 20 | 20 | 20 | 20 | 20 |
| Stearic Acid | — | — | — | — | — |
| TOFA | 12 | 7 | 5 | 4 | — |
| HMDA, 70% | 45 | 45 | 45 | 45 | 45 |
| Piperazine | 43 | 43 | 43 | 43 | 43 |
| Jeffamine D400 | 7 | 7 | 7 | 7 | 7 |
| Jeffamine D2000 | 5 | 5 | 5 | 5 | 5 |
| Acid/Amine Ratio | 0.94/1 | 0.835/1 | 0.835/1 | 0.835/1 | 0.78/1 |
| SIC/Polyamide Molar Ratio | 1.5/1 | 1/1 | 1/1 | 1.2/1 | 0.8/1 |
| SIC 2295.5, Wt. % | 2.2 | 4.3 | 4.3 | 5.1 | 4.6 |

TABLE 5

INVENTIVE COMPOSITIONS

| COMPONENT | EQ. % | | |
|---|---|---|---|
| | U | V | W |
| Dimer Acid | 80 | 80 | 80 |
| Sebacic Acid | 20 | 20 | 20 |
| Stearic Acid | — | — | — |

TABLE 5-continued

INVENTIVE COMPOSITIONS

| | EQ. % | | |
|---|---|---|---|
| COMPONENT | U | V | W |
| TOFA | — | — | — |
| HMDA, 70% | 45 | 45 | 45 |
| Piperazine | 43 | 43 | 43 |
| Jeffamine D400 | 7 | 7 | 7 |
| Jeffamine D2000 | 5 | 5 | 5 |
| Acid/Amine Ratio | 0.78/1 | 0.78/1 | 0.78/1 |
| SIC/Polyamide Molar Ratio | 1/1 | 1.2/1 | 1.5/1 |
| SIG 5836.0, Wt. % | 4.6 | 5.5 | 6.9 |

The crosslinkable polyamides were cured under ambient atmospheric conditions. Various properties of the compositions were evaluated following curing. Specifically, test samples of the composition were subjected to various test methods to determine characteristics of the composition including ASTM D 3236-88 (Brookfield spindle 27; 10 g sample in a viscometer-tube conditioned for 10 min at 350° F. under nitrogen and a reading taken following such treatment) for determining viscosity, ASTM E 28-99 (molten polyamide was poured onto a ring and checked after 2-3 hrs with Ring and Ball instrument) for determining softening point (SP), ASTM D 638-00 (cut macro dogbones and micro dogbones from a 50 mil plaque and tensile run after curing time) for determining tensile strength and molten polyamide from a viscometer tube at 350° F. poured onto a cardboard using a 10 mil draw down bar with the time checked every 30 seconds for determining open time. In particular, the following properties were determined using the aforementioned methods: viscosity, softening point, tensile strength (AV, AmV, 2% modulus, % elongation, ultimate tensile break and yield point), open time and curing time. Results of the inventive compositions of Tables 1-5 are detailed below in Tables 6-10, respectively.

TABLE 6

| | INVENTIVE COMPOSITION | | | | | |
|---|---|---|---|---|---|---|
| PROPERTY | A | B | C | D | E | F |
| Viscosity at 350° F., P | 12 | 15 | 16 | 35 | 57 | 182 |
| SP, ° C. | 122 | 117 | 115 | 116 | 120 | 119 |
| AV, mgKOH/g | 2.7 | 0.9 | 1.2 | 0.8 | 1 | 0.9 |
| AmV, mgKOH/g | 10 | 15.8 | 16.6 | 10.5 | 9.3 | 6.5 |
| 2% Modulus, psi | 7,300 | 9,500 | 7,900 | 8,600 | 7,200 | 7,100 |
| Elongation, % | 140 | 260 | 130 | 200 | 120 | 170 |
| Ultimate Tensile Break, psi | 510 | 610 | 460 | 620 | 510 | 600 |
| Yield point, psi | 320 | 410 | 390 | 400 | 380 | 400 |
| Open Time, min. | 5 | 5 | 4 | 3½ | 1 | ⅙ |
| Curing Time, d | 14 | 14 | 14 | 14 | 14 | 7 |

TABLE 7

| | INVENTIVE COMPOSITION | | | | | |
|---|---|---|---|---|---|---|
| PROPERTY | G | H | I | J | K | L |
| Viscosity at 350° F., P | 18 | 60 | 30 | 17 | 29 | 28 |
| SP, ° C. | 117 | 120 | 119 | 118 | 121 | 118 |
| AV, mgKOH/g | 1 | 0.7 | 0.8 | 0.6 | 1.7 | 1 |
| AmV, mgKOH/g | 15.7 | 10.2 | 10.4 | 13.8 | 14.1 | 13.4 |
| 2% Modulus, psi | 11,300 | 11,000 | 12,000 | 12,400 | 8,700 | 11,550 |
| Elongation, % | 130 | 200 | 100 | 130 | 90 | 185 |

TABLE 7-continued

| | INVENTIVE COMPOSITION | | | | | |
|---|---|---|---|---|---|---|
| PROPERTY | G | H | I | J | K | L |
| Ultimate Tensile Break, psi | 570 | 780 | 640 | 580 | 460 | 830 |
| Yield point, psi | 500 | 510 | 600 | 570 | 400 | 550 |
| Open Time, min. | 3½ | ½ | 1 | 3 | 4 | 2½ |
| Curing Time, d | 14 | 9 | 21 | 28 | 14 | 14 |

TABLE 8

| | INVENTIVE COMPOSITION | | |
|---|---|---|---|
| PROPERTY | M | N | O |
| Viscosity at 350° F., P | 15 | 22 | 26 |
| SP, ° C. | 121 | 117 | 118 |
| AV, mgKOH/g | 15 | 13 | 11 |
| AmV, mgKOH/g | 0 | 0 | 0 |
| 2% Modulus, psi | 8,400 | 7,950 | 7,700 |
| Elongation, % | 80 | 90 | 100 |
| Ultimate Tensile Break, psi | 440 | 340 | 410 |
| Yield point, psi | 490 | 450 | 440 |
| Open Time, min. | 3½ | 3½ | 4 |
| Curing Time, d | 21 | 21 | 14 |

TABLE 9

| | INVENTIVE COMPOSITION | | | | |
|---|---|---|---|---|---|
| PROPERTY | P | Q | R | S | T |
| Viscosity at 350° F., P | 10 | 12 | 22 | 24 | 18 |
| SP, ° C. | 110 | 113 | 110 | 118 | 119 |
| AV, mgKOH/g | 8 | 10 | 11 | 12 | 11 |
| AmV, mgKOH/g | 0 | 0 | 0 | 0 | 7.5 |
| 2% Modulus, psi | 6,500 | 7,900 | 6,900 | 6,750 | 6,150 |
| Elongation, % | 40 | 110 | 220 | 290 | 260 |
| Ultimate Tensile Break, psi | 180 | 250 | 380 | 500 | 450 |
| Yield point, psi | 290 | 380 | 365 | 320 | 330 |
| Open Time, min. | 8 | 6 | 3½ | 2 | 1½ |
| Curing Time, d | 21 | 21 | 21 | 21 | 21 |

TABLE 10

| | INVENTIVE COMPOSITION | | |
|---|---|---|---|
| PROPERTY | U | V | W |
| Viscosity at 350° F., P | 14 | 12 | 18 |
| SP, ° C. | 116 | 116 | 113 |
| AV, mgKOH/g | 1 | 1.7 | 1 |
| AmV, mgKOH/g | 16 | 15 | 14 |
| 2% Modulus, psi | 5,000 | 7,250 | 7,100 |
| Elongation, % | 50 | 50 | 80 |
| Ultimate Tensile Break, psi | 260 | 260 | 220 |
| Yield point, psi | 350 | 370 | 360 |
| Open Time, min. | 4 | 4 | 3½ |
| Curing Time, d | 28 | 28 | 28 |

As reflected in the examples of the present invention provided, polyamides of the present invention exhibit desirable thermomechanical properties following crosslinking upon exposure to moisture. In general, increased open time and mechanical strength are diametrically opposed. Surprisingly, the crosslinkable polyamides of the present invention exhibited long open times while maintaining sufficient green strength to result in a desirable final mechanical strength that is sufficient to bind a particular substrate thereto.

The invention claimed is:

1. A process for producing a moisture-curable hot melt composition comprising:
   producing a polyamide by the polycondensation of:
   66 to 80 Eq % of at least one dimerized $C_{12}$ to $C_{24}$ unsaturated fatty acid;
   20 to 30 Eq % of at least one $C_6$ to $C_{22}$ aliphatic dicarboxylic acid;
   optionally 3 to 4 Eq % of carboxylic acid;
   optionally 3 to 12 Eq % of monomer fatty acid;
   45 to 47 Eq % of at least one $C_6$ to $C_{22}$ alkylene diamine;
   37 to 53 Eq % of at least one heterocyclic secondary diamine; and
   optionally 6 to 18 Eq % of at least one polyoxyalkylenediamine;
   wherein the Eq % of the acid components is equal to 100 and the Eq % of the amine components is equal to 100;
   reacting the polyamide with a chloromethylphenyl-functionalized alkoxysilane under conditions resulting in attachment of chloromethylphenyl-functionalized di-alkoxysilane or tri-alkoxysilane terminal groups to the polyamide,
   wherein the molar ratio of the functionalized alkoxysilane component to the polyamide component ranges from greater than 1:1 to about 2:1.

2. The process of claim 1, wherein the functionalized alkoxysilane component to the polyamide component is in a molar ratio of about 1.2:1 to about 2:1.

3. The moisture-curable hot melt composition produced by the process of claim 1.

4. The moisture-curable hot melt composition of claim 3 having an open time of at least 180 seconds.

5. The moisture-curable hot melt composition of claim 3 having a viscosity at 350° F. and 1 atmosphere pressure in the range of about 10 P to about 190 P.

6. The moisture-curable hot melt composition of claim 3 having a softening point of 125° C. or less.

7. The moisture-curable hot melt composition of claim 3 having a curing time of at least 7 days.

8. The moisture-curable hot melt composition of claim 3 having a mechanical strength of at least 31 MPa as measured using ASTM Standard D 638-00.

9. The moisture-curable adhesive composition of claim 3 having an ultimate tensile break of at least 180 psi.

10. The moisture-curable adhesive composition of claim 3 having a yield point of at least 290 psi.

11. An article comprising a first substrate joined to a second substrate by cured reaction products of the moisture-curable adhesive composition of claim 3.

12. A method of bonding a first substrate to a second substrate comprising applying the moisture-curable hot melt composition of claim 3 to a surface of said first substrate to form a coating on said surface, contacting said surface having the coating with a surface of said second substrate and permitting the moisture-curable hot melt composition to moisture-cure.

13. The process of claim 1, wherein the at least one heterocyclic secondary diamine is piperazine.

14. The process of claim 1, wherein the polyamide includes 6 to 18 Eq % of at least one polyoxyalkylenediamine.

15. A moisture-curable hot melt composition comprising the reaction product of:
   a polyamide that is the polycondensation product of:
   66 to 80 Eq % of at least one dimerized $C_{12}$ to $C_{24}$ unsaturated fatty acid;
   20 to 30 Eq % of at least one 06 to $C_{22}$ aliphatic dicarboxylic acid;
   optionally 3 to 4 Eq % of carboxylic acid;
   optionally 3 to 12 Eq % of monomer fatty acid;
   45 to 47 Eq % of at least one $C_6$ to $C_{22}$ alkylene diamine;
   37 to 53 Eq % of at least one heterocyclic secondary diamine; and
   optionally 6 to 18 Eq % of at least one polyoxyalkylenediamine;
   wherein the Eq % of the acid components is equal to 100 and the Eq % of the amine components is equal to 100; and
   an epoxide-functionalized alkoxysilane or a chloromethylphenyl-functionalized alkoxysilane under conditions resulting in attachment of epoxide-functionalized or chloromethylphenyl-functionalized di-alkoxysilane or tri-alkoxysilane terminal groups to the polyamide,
   wherein the molar ratio of the functionalized alkoxysilane component to the polyamide component ranges from greater than 1:1 to about 2:1;
   wherein the moisture-curable adhesive composition has an elongation of 40% to 185% as measured using ASTM Standard D 638-00.

16. The moisture-curable adhesive composition of claim 15 having an elongation of 40% to 170% as measured using ASTM Standard D 638-00.

* * * * *